UNITED STATES PATENT OFFICE.

PAUL SABATIER AND ALPHONSE MAILHE, OF TOULOUSE, FRANCE, ASSIGNORS TO SOCIÉTÉ DES RAFFINERIES CATALYTIQUES DES PÉTROLES ET HYDROCARBURES, OF PARIS, FRANCE.

PROCESS OF CONVERTING PETROLEUMS AND OTHER HEAVY LIQUID HYDROCARBONS INTO VOLATILE HYDROCARBONS DISTILLING BELOW 150° C.

1,152,765.  Specification of Letters Patent.  Patented Sept. 7, 1915.

No Drawing.   Application filed July 11, 1914.   Serial No. 850,502.

*To all whom it may concern:*

Be it known that we, PAUL SABATIER and ALPHONSE MAILHE, citizens of the Republic of France, and residents of Toulouse, France, have invented a new and useful Process of Converting Petroleums and other Heavy Liquid Hydrocarbons into Volatile Hydrocarbons Distilling Below 150° C., which is fully set forth in the following specification.

In our prior French Patent, No. 400,141, dated May 21, 1908, there is described a process of transforming crude petroleums or lamp oils into essences distilling below 150° C., the process comprising two stages: the first of which consists in passing vapors of crude petroleum, or of crude petroleum deprived of the essence, over divided metals heated to a temperature between 400° C. and dark red heat; the second stage consisting in converting into products of a not unpleasant smell, the volatile products obtained in the first stage and consisting for the greater part of non-saturated oxidizable hydrocarbons of unpleasant smell, by submitting their vapors to hydrogenation in the presence of divided metals maintained at a temperature between 150° and 300° C. The two stages of the process can be combined, so as to bring about a continuous manufacture. Experiments carried on, have shown that, by following the course indicated in the first stage, that is to say, by using the divided metals described in the above-identified patent, namely porphyrized iron, divided copper, copper, iron, nickel, cobalt obtained by the reduction of oxids by hydrogen or any other reducing gases, zinc powder, divided platinum, or the same metals taken in the form of filings, or mixtures of the same metals associated in various proportions, which mixtures are obtained by the association of the metals prepared beforehand, or prepared by the reduction of the mixtures of oxids, or obtained by chemical precipitation, such as iron or zinc in the form of powder, brought into contact with copper solutions, or the same divided metals supported on pumice stone, asbestos or coke, the deposits of carbon materials produced, form with the said metals compact "associations" which are impenetrable by gases or vapors, paralyze their action and cannot be conveniently regenerated by the process described in the said patent, that is to say, by the action of steam at 500° C. or by an oxidation followed by a reduction by means of hydrogen or any other reducing gas. This effect is still more pronounced when for dividing the material, are used silicates or silicious materials such as pumice stone, asbestos, coke, silica, etc., capable of forming with the metals or their oxids, easily melting slag which produces a compact material impenetrable by the gases and vapors.

The present process consists in substituting, for the preceding metals, either the same metals, or the oxids or salts capable of producing them by reduction, mixed with neutral materials free from silica, such as magnesia, alumina or bauxite, lime, baryta, strontium or carbonates of the same oxids, graphite or any other neutral substance which does not contain considerable quantities of silica, or even the same metals, oxids or salts, either alone or mixed, "associated" with the same neutral materials by any desired agglutinant which does not contain silica, (glue, dextrin, starch, etc.). The agglomerates thus formed, are molded in the shape of regular or irregular briquets, balls, tubes, coatings or fragments of any desired shape. These agglomerates dry, or the mixtures above referred to, are introduced into tubes of iron, cast iron, steel, etc., or into earthenware tubes provided inside with a non-silicious coating, such as magnesia, baryta, bauxite, etc.

The temperature at which the said first stage is carried out with the assistance of the materials described, will be between 400° C. and bright red heat.

When oxids are used in place of metals in the mixtures described, or in the agglomerates above referred to, the reduction of the said oxids can be effected by means of vapors of hydrocarbons, at the same temperature as that present at the beginning of the first stage.

The said first stage, in which vapors of lamp oils or crude petroleums or petroleums deprived of essences, any residues of petroleums or shale oils or resin oils or any other liquid hydrocarbons of any origin, are caused to pass over the above mentioned mixtures or agglomerates, results in producing gases and volatile liquids easy to condense, and in the formation of carbon deposits on the mixtures or agglomerates, which, at the end of a very long time, reduce their activity. When the said reduction of activity has become considerable, it is very easy to revivify the catalyzer, first by the action of steam at the same temperatures, the steam being substituted for the vapors of hydrocarbons to be converted. This action changes the metal into oxid, the gas generated during the said reaction consisting of a mixture of hydrogen, carbon oxid and carbonic anhydrid, a gaseous mixture which can be utilized in other operations, either as a reducing gas or as a fuel, immediately or after having been deprived of carbonic anhydrid by being washed in a suitable alkaline absorbent under pressure, or by some other means, consequently, when the generation of gas by the steam has stopped, and the whole metal has been converted into oxid, the steam is replaced by hydrocarbon vapors to be converted. These vapors first of all reduce the oxid into metal which begins almost immediately to produce the "redoubling" referred to in the first stage, and the reaction again continues as hereinbefore described.

The first stage of the present process comprises therefore two steps; during the first of which hydrocarbons, petroleums, shale oils or resin oils are introduced, which initially reduce the oxid formed, into metal, and subsequently are partly transformed into gas, liquids more volatile than the original product, and carbon, under the action of the divided metal thus produced; and the second step, in which steam is used to remove the carbon deposited in the mass during the first step. These two consecutive steps can be repeated indefinitely. Their respective duration varies according to the nature of the materials selected and according to the nature of the hydrocarbons to be converted.

The volatile portions distilling below 150° C., obtained during this first stage, may be separated out and converted into saturated non-oxidizable hydrocarbons, by direct hydrogenation by the process described in the aforesaid French patent, or by any other process. As regards the liquid portions obtained, which are not volatile below 150°, they are repeatedly treated like the original hydrocarbons, until the complete conversion.

Example 1. Mix thoroughly 40 gr. of calcined magnesia with 100 gr. of porphyrized iron filings; the very homogeneous mixture must be stirred from time to time in order to avoid deposit of iron.

Example 2. Mix thoroughly 50 gr. of calcined magnesia and 120 gr. of iron filings. Add a solution of dextrin, so as to obtain a homogeneous paste which is molded to form briquets, and dried.

Example 3. Mix in a thoroughly homogeneous manner 60 gr. of bauxite and 100 gr. of porphyrized iron. The mixture introduced into a tube, is stirred from time to time.

Example 4. As perfect mixture as possible of 20 gr. of calcined magnesia, bauxite (60 gr.) and oxid of iron (150 gr.) is reduced to paste by means of glue. From the said paste are formed briquets of any desired shape, which are dried in a slow heat.

Example 5. 30 gr. of precipitated alumina and 80 gr. of porphyrized iron are mixed. The whole is agglutinated with a solution of dextrin, and the mass used for making briquets.

It goes without saying that the proportions of the different products mixed together can be changed.

Claims:

1. The herein-described process of converting petroleums and other heavy liquid hydrocarbons of any origin whatever into volatile hydrocarbons distilling below 150° C., which consists in mixing a body of finely-divided catalytic material with neutral substances free from considerable quantities of silica, to reduce the catalyzing property of said catalytic body; heating the mixture to a temperature between 400° C. and dark red heat; passing the hydrocarbons to be treated over said mixture; passing steam at the same temperature over the catalytic body to revivify the latter by the water gas formed by the passing steam; and subjecting the volatile products obtained from such treatment to hydrogenation in the presence of finely-divided metals heated to a temperature between 150° and 300° C.

2. The herein-described process of converting petroleums and other heavy liquid hydrocarbons into volatile hydrocarbons distilling below 150° C., which consists in mixing a catalytic body of finely-divided iron with neutral substances free from considerable quantities of silica, to reduce the catalyzing property of said catalytic body; heating the mixture to a temperature between 400° C. and dark red heat; passing the hydrocarbons to be treated over said mixture; passing steam at the same temperature over the catalytic body to revivify the latter by the water gas formed by the passing steam; and subjecting the volatile products obtained from such treatment to hydrogenation in the presence of finely-divided metals heated to a temperature between 150° and 300° C.

3. The herein-described process of converting petroleums and other heavy liquid hydrocarbons into liquid hydrocarbons distilling below 150° C., which consists in mixing a catalytic body of finely-divided metallic substances with neutral substances free from considerable quantities of silica, to reduce the catalyzing property of said metallic substances; agglomerating the mixture with a binder which is free from silica; heating the agglomerate to a temperature between 400° C. and dark red heat; passing the hydrocarbons to be treated over said agglomerate; passing steam at the same temperature over the catalytic body to revivify the latter by the water gas formed by the passing steam; and subjecting the volatile products obtained from such treatment to hydrogenation in the presence of finely-divided metals heated to a temperature between 150° and 300° C.

4. The herein-described process of converting petroleums and other heavy liquid hydrocarbons into liquid hydrocarbons distilling below 150° C., which consists in mixing a catalytic body of finely-divided metallic substances with neutral substances free from considerable quantities of silica, to reduce the catalyzing property of said metallic substances; introducing the mixture into tubes lined with non-silicious material; heating said tubes to a temperature between 400° C. and dark red heat; passing the hydrocarbons to be treated over said tubes; passing steam at the same temperature over the catalytic body to revivify the latter by the water gas formed by the passing steam; and subjecting the volatile products obtained from such treatment to hydrogenation in the presence of finely-divided metals heated to a temperature between 150° and 300° C.

In testimony whereof we have signed this specification in the presence of two subscribing witnesses.

PAUL SABATIER.
ALPHONSE MAILHE.

Witnesses:
AVUNT JEANST,
JULES ZOUSSET.